J. WILKINSON,

Assignor, of one-half interest to W. S. WILKINSON.

Ventilating and Cooling Dairies.

No. 9,051. Reissued Jan. 20, 1880.

*Witnesses:*

N. N. Low.

N. H. Bliss

*Inventor:*

John Wilkinson by H. A. Donbledan

Atty

N. PETERS, PHOTO-LITHOGRAPHER, WASHINGTON, D. C.

UNITED STATES PATENT OFFICE.

JOHN WILKINSON, OF HARVARD, ILLINOIS, ASSIGNOR OF ONE-HALF INTEREST TO WALTER S. WILKINSON.

VENTILATING AND COOLING DAIRIES.

SPECIFICATION forming part of Reissued Letters Patent No. 9,051, dated January 20, 1880.

Original No. 159,055, dated January 26, 1875. Application for Reissue filed April 14, 1879.

*To all whom it may concern:*

Be it known that I, JOHN WILKINSON, of Harvard, in the county of McHenry and State of Illinois, have invented certain new and useful Improvements in Devices for Ventilating; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates, first, to the cooling of milk and dairy products by means of a circulating current of water confined within a sink, one end of which occupies a position in an ice-house and the other end a similar position in a dairy-room, the velocity of said current, when unrestrained, being controlled by the relative temperatures of the ice-house and dairy, the said sink containing devices for governing or restraining the activity and extent of the circulating current to regulate the temperature of the milk, and others to prevent the equalizing of the temperatures of the ice-house and dairy by the passage of air over the surface of the water in the sink, as it varies in depth under circumstances hereinafter described.

My invention relates, secondly, to a method of ventilating the dairy-room by means of mechanism hereinafter fully set forth.

In the further description of my invention which follows due reference must be had to the accompanying drawings, in which—

Figure 2:
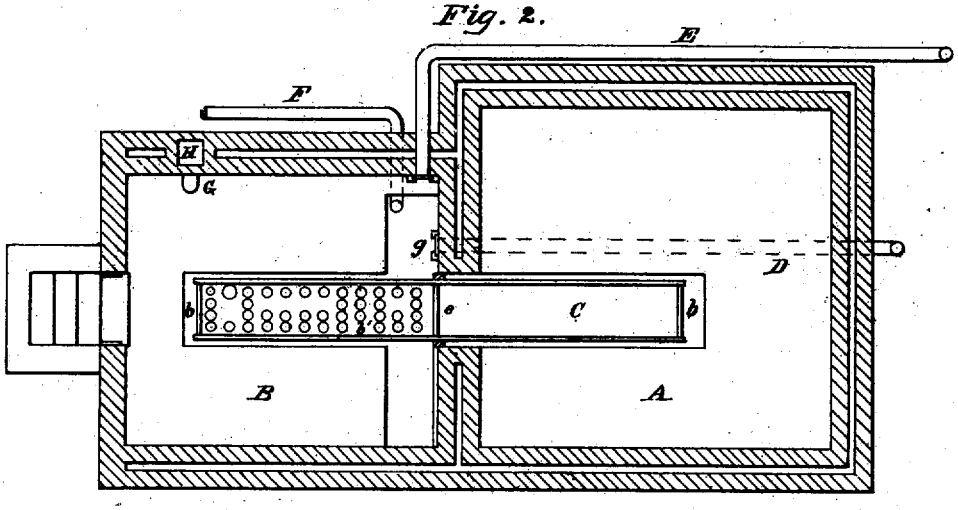
Figure 1:
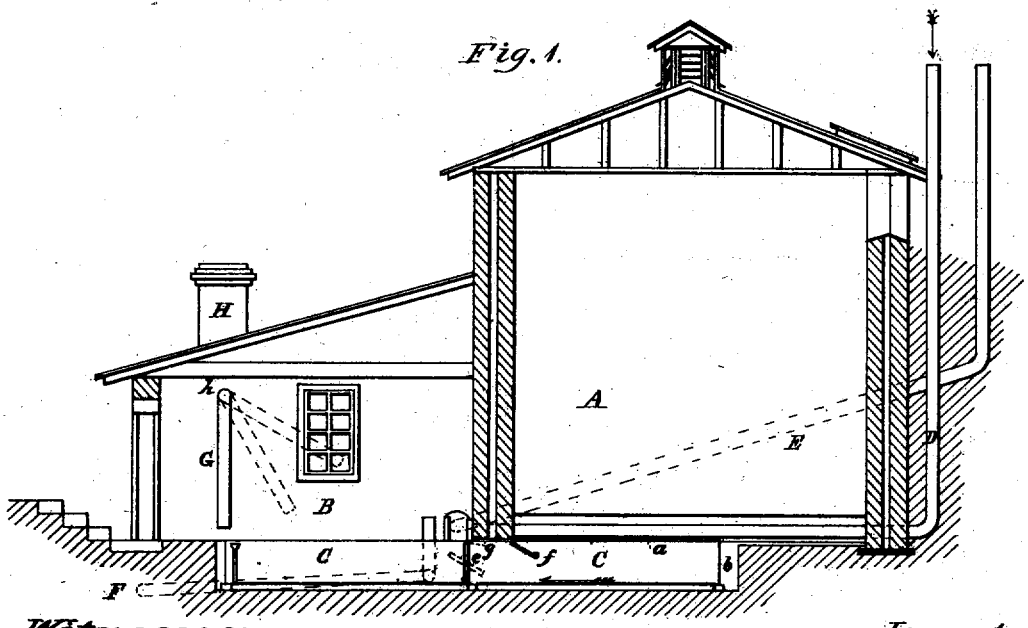

Figure 1 is a longitudinal section of an ice-house and dairy, showing my improvements; and Fig. 2 is a sectional plan of the same.

Similar letters of reference indicate similar parts of the invention in both figures.

A represents the ice-house, and B the dairy. C is a sink, one portion of which is located in the ice-house, where it is protected by a cover, *a*, from the entrance to the sink of sawdust and other matter, and placed in a vat, *b*, in the floor of the dairy. The vat is larger than the sink to admit of an air-space around it, for obvious purposes.

For the better understanding of the application of a circulating current of water to the cooling of milk, as embraced in my present invention, I refer to Letters Patent No. 150,644, granted to me May 5, 1874, in which patent the principle of circulating fluids is fully described, as well as the advantages arising therefrom.

The velocity of the circulating current in the sink C varies with the heat of the milk to be refrigerated and the temperature of the dairy-room, and may be more rapid than is required to maintain the necessary temperature of the milk in the cans *b'*. To check the rapidity of circulation and rate of conduction of heat from the milk, I use a winged valve, *e*, adapted to be operated by means of a lever in the dairy-room.

The opening in the partition-wall above the sink is occupied by a suspended floating valve, *f*, the lower edge of which rests upon the surface of the water to prevent any circulation of air between the ice-house and the dairy as the depth of the water is lessened by the removal of one or more of the milk-cans. The valve *f* is packed at the sides by means of strips of flexible material attached thereto, which bear against the sides of the sink.

The water from the melting ice passes into the sink C, and thus forms its supply, the low temperature of the inflowing water being thus utilized. Water from the sink is carried off through an overflow.

Figure 3:
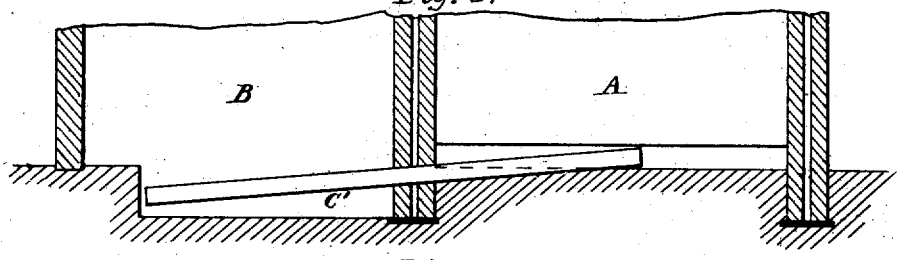

In Fig. 3 a pipe, C', is shown extending from the ice-house and below the floor thereof to a sink in the floor of the dairy-room. The pipe C', which is sealed at the ends and nearly filled with water, may be either inclined, as shown, or laid in a horizontal position. By this arrangement the sink is cooled by a circulating current of water in the pipe, similar to the current in the sink shown in Figs. 1 and 2.

The ventilation of the dairy-room is accomplished by means of a system of pipes or ducts, in conjunction with a flue or chimney, as follows:

D is a pipe, provided with a stop-valve, *g*, commencing in the dairy-room near the partition-wall, passing through the same and under the floor of the ice-house, and thence vertically, at the back of the wall, to a point above the roof of the ice-house. Another pipe, E, laid in the ground below solar influence, extends from the dairy in an ascending line to a point, say, one hundred feet from the building, at which point it rises vertically to a height corresponding to that of pipe D. F is another subterranean duct, leading from the dairy-room to the outer air at some distance from the dairy in a descending line.

G represents an adjustable egress-pipe, the upper end of which passes into the flue or chimney H.

The connection at *h* is of such character as to admit of the pipe G being placed and secured at any desired angle, two of the angular positions being shown by dotted lines.

The pipe D, with the pipe G in any of its positions, forms an inverted siphon, the dairy-room supplying the connection between them, or constituting a continuation of one to the other.

The air which passes down the long leg of the siphon, which is the pipe D, and issues out of the pipe G and chimney H, which represents the short leg, is cooled in its passage under the ice-house floor. This method of ventilating and cooling the dairy-room is thoroughly effective, but is only used when the milk is at a high temperature.

The other methods, and those generally employed, are the pipe E used in connection with the pipe G and the pipe E in conjunction with the duct F, which has at the inner end thereof a pipe similar to G, but reversed in position.

The duct F, which is inclined from the dairy, is used either as a mode of ingress or egress, as the relative temperatures of the outer air and air in the dairy-room differ.

When the air in the dairy-room is to be maintained at a temperature lower than the exterior atmosphere, the duct becomes a medium of egress; but when the relative temperatures of the dairy-room and exterior atmosphere are reversed it becomes an ingress-duct, and is the medium of air-supply for the dairy.

When the egress-pipe G is used either in connection with the pipes D or E, the atmosphere in the dairy can be cooled to an altitude governed by the angular position of said egress-pipe and a shallow stratum of cool air maintained at the floor, while all above it is suitable for human occupancy.

All the pipes, both ingress and egress, are supplied with regulating-valves.

The advantages of a circulating current of water over that supplied by a spring are numerous, among which may be mentioned the extent and facility with which the temperature of the water may be definitely increased or diminished to suit the peculiar requirements of the milk in its different conditions and the freedom from danger of freezing in severe weather.

The thorough manner in which the dairy is ventilated and the temperature regulated at all seasons of the year renders its hygienic condition all that can be desired.

I am aware that in an Italian villa occupied by the Trenti family in the year 1663 there was a plan adopted for ventilating the rooms by the admission of air from a cave through a channel of some description, and that "when they would have cool air in summer in any of the rooms they shut up a gate in the cave and opened a door at the end of the channel, which let in the pure air, every room having a hole in the wall or pavement to admit it;" but from the fact that they were obliged to open and shut up a gate and open a door I am led to believe that their contrivance was radically different from mine, because I am not obliged to open one gate or door and close another gate or door in order to operate my invention.

Having thus described my invention, what I claim as new, and desire to secure, is—

1. In an ice-house and dairy placed contiguously, the sink C, in combination with the valves *e* and *f*, substantially as and for the purposes specified.

2. The system of air pipes or ducts represented by D E F G, relatively arranged, substantially as and for the purposes set forth.

3. As a means of ventilating and regulating the temperature of an inclosed room, the subterranean air-duct F, communicating with the open air at a point not above the horizontal plane upon which it opens into the room, in combination with a continuous air-pipe which communicates at one end with the room below the ceiling and at the other end with the air outside of the room above the ceiling of the room, substantially as set forth.

4. As a means for ventilating and regulating the temperature of an inclosed room, the subterranean air-duct F, communicating with the open air at a point not above the horizontal plane upon which it opens into the room, in combination with an air-pipe a portion of which is under ground, through which air can pass into or out of the room, substantially as set forth.

5. As a means for ventilating and regulating the temperature of an inclosed room, the subterranean air-duct F, one end of which receives air from the room at a point above the floor and discharges it at a point below its receiving end, in combination with an air-duct a portion of which is under ground, and which enters the room at a point below the receiving end of the discharging-duct, substantially as set forth.

6. As a means for ventilating and regulating the temperature of an inclosed room, the subterranean air-duct F, in combination with an egress-pipe the receiving end of which may be adjusted to various heights from the floor, substantially as set forth.

In testimony that I claim the foregoing I have hereunto set my hand this 3d day of April, 1879.

JOHN WILKINSON.

Witnesses:
ARCHIBALD DAVIDSON,
J. G. CALLENDER.